(12) United States Patent
Jang et al.

(10) Patent No.: US 12,601,379 B2
(45) Date of Patent: Apr. 14, 2026

(54) CONSTANT VELOCITY JOINT AND DRIVESHAFT INCLUDING SAME

(71) Applicant: ERAE AMS CO., LTD., Daegu (KR)

(72) Inventors: Dal Soo Jang, Daegu (KR); Byeong Jun Cho, Daegu (KR); Dong Ju Kwak, Daegu (KR)

(73) Assignee: HANSAE MOBILITY CO., LTD., Daegu (KR)

( * ) Notice: Subject to any disclaimer, the term of this patent is extended or adjusted under 35 U.S.C. 154(b) by 0 days.

(21) Appl. No.: 18/989,963

(22) Filed: Dec. 20, 2024

(65) Prior Publication Data

US 2025/0237271 A1 Jul. 24, 2025

(30) Foreign Application Priority Data

Jan. 18, 2024 (KR) ......................... 10-2024-0008038

(51) Int. Cl.
*F16D 3/224* (2011.01)
*F16D 3/06* (2006.01)
*F16D 3/223* (2011.01)

(52) U.S. Cl.
CPC ............. *F16D 3/224* (2013.01); *F16D 3/065* (2013.01); *F16D 2003/22306* (2013.01); *F16D 2003/22313* (2013.01); *Y10S 464/906* (2013.01)

(58) Field of Classification Search
CPC ..................... F16D 3/224; F16D 3/065; F16D 2003/22306; F16D 2003/22313; Y10S 464/906

(Continued)

(56) References Cited

U.S. PATENT DOCUMENTS 4,254,639 A * 3/1981 Teramachi .............. F16D 3/065
464/167
4,950,206 A * 8/1990 Jacob .................... F16D 3/2233
464/145
(Continued)

FOREIGN PATENT DOCUMENTS

KR 10-2015-0124317 A 11/2015
KR 10-2017-0142735 A 12/2017
(Continued)

OTHER PUBLICATIONS

Universal Joint and Driveshaft Design Manual, AE-7, Society of Automotive Engineers Inc., Warrendale, PA, Section 3.2.9., pp. 151-153. TJ1079.S62. (Year: 1979).*

(Continued)

*Primary Examiner* — Greg Binda
(74) *Attorney, Agent, or Firm* — Sughrue Mion, PLLC

(57) ABSTRACT

A constant velocity joint configured to be coupled to an interconnecting shaft includes: an outer race forming a plurality of outer ball tracks; an inner race forming a plurality of inner ball tracks; a ball cage interposed between the outer race and the inner race and forming a plurality of windows; and a plurality of torque transmitting balls. The outer race and the inner race are configured to implement an angular articulation function that allows for relative angular displacement therebetween, and the inner race is coupled to the interconnecting shaft via a ball spline coupling structure to implement a length displacement function. The ball spline coupling structure includes: an outer spline groove; an inner spline groove; a sleeve member interposed between the inner race and the interconnecting shaft; and a plurality of spline balls, with said spline balls being accommodated within a sleeve window formed on the sleeve member.

12 Claims, 13 Drawing Sheets

(58) Field of Classification Search
USPC ..................................... 464/145, 167; 384/49
See application file for complete search history.

(56) References Cited

U.S. PATENT DOCUMENTS

| | | | | | |
|---|---|---|---|---|---|
| 5,647,801 | A | * | 7/1997 | Jacob | ...................... F16D 3/223 |
| | | | | | 464/145 |
| 6,241,617 | B1 | * | 6/2001 | Jacob | ...................... F16C 3/035 |
| | | | | | 464/167 |

FOREIGN PATENT DOCUMENTS

| KR | 10-2018-0071707 | A | 6/2018 |
|---|---|---|---|
| KR | 10-2179859 | B1 | 11/2020 |
| KR | 10-2201203 | B1 | 1/2021 |
| KR | 10-2021-0101007 | A | 8/2021 |
| KR | 10-2730421 | B1 | 11/2024 |

OTHER PUBLICATIONS

International Search Report issued Mar. 24, 2025 in Application No. PCT/KR2024/097173.

* cited by examiner

Fig. 14

CONSTANT VELOCITY JOINT AND DRIVESHAFT INCLUDING SAME

CROSS-REFERENCE TO RELATED APPLICATION

This application claims the benefit of Korean Patent Application No. 10-2024-0008038, filed Jan. 18, 2024, which is incorporated by reference herein in its entirety.

BACKGROUND OF THE INVENTION

This disclosure relates to a constant velocity joint used for transmitting driving force in a vehicle, and a driveshaft that includes the constant velocity joint.

The constant velocity joint, which is a power transmission component, forms part of a drivetrain system that transmits a driving force generated by a vehicle's power source, such as an internal combustion engine or an electric motor, to the wheels. As is well known, the constant velocity joint may be designed to transmit rotational driving force while accommodating angular displacement and axial length displacement that occur during vehicle operation.

Typically, the constant velocity joint is part of a driveshaft or a halfshaft. The driveshaft includes a interconnecting shaft and a pair of constant velocity joints, each of which is attached to either end of the interconnecting shaft. Among the pair of constant velocity joints, the one positioned on an inner side of a lateral direction of a vehicle is generally referred to as an inboard joint, while the one positioned on an outer side is generally referred to as an outboard joint. Such a driveshaft is designed to provide both angular movement and axial displacement functionality at the constant velocity joint. A common method to achieve axial displacement in the driveshaft is to configure one of the constant velocity joints, e.g., typically the inboard joint, as a structure capable of axial displacement, such as a tripod constant velocity joint. However, the tripod constant velocity joint is disadvantageous in aspects of a structure and a cost compared to a so-called Rzeppa joint.

Another method for implementing the axial displacement functionality in a driveshaft is to apply a ball spline structure to the interconnecting shaft, as disclosed in Korean Patent Registration No. 10-2179859, allowing the interconnecting shaft to have axial displacement capability. Additionally, vehicles may experience lateral shaking during rapid acceleration, a phenomenon caused by the resonance between the axial force generated by the driveshaft (Generated Axial Force, GAF) and the output from the engine or electric motor. Minimizing this phenomenon is one of the key challenges in vehicle design, and a method that has been introduced to address this involves using a premium tripod constant velocity joint designed to minimize GAF. However, in vehicles with a high height, the improvements provided by the premium tripod constant velocity joint are limited. A driveshaft with a ball spline-structured interconnecting shaft offers a good alternative to reduce such phenomenon and also provides the advantage of allowing for a higher height in vehicle design. Moreover, the ball spline structure has the benefit of providing excellent NVH (Noise, Vibration, and Harshness) performance. However, a interconnecting shaft with a ball spline structure requires a diameter up to 60% larger than that of a conventional hollow or solid interconnecting shaft, necessitating more installation space and posing challenges in vehicle design. Additionally, a interconnecting shaft with a ball spline structure is heavier than a conventional shaft, negatively impacting vehicle fuel efficiency or energy efficiency and complicating the manufacturing process, leading to higher production costs. Therefore, there is a need for a solution that can utilize the advantages of the ball spline structure while overcoming the aforementioned drawbacks.

PRIOR ART DOCUMENT

Korean Patent Registration No. 10-2179859

The details described in the Background Art section are provided to enhance understanding of the background and may include information that is not part of the prior art already known in the field to which this technology belongs.

BRIEF SUMMARY OF THE INVENTION

The objective of this invention is to provide a constant velocity joint and a driveshaft that includes the same, which not only adopts the advantages of a ball spline structure but also reduces the diameter and weight of the interconnecting shaft, while featuring a simplified manufacturing process and lower production costs.

The technical objectives that this invention aims to achieve are not limited to those mentioned above. Other technical objectives, not explicitly stated, will be understood by those skilled in the art from the following description.

In an embodiment of the present invention, a constant velocity joint configured to be coupled to an interconnecting shaft of a driveshaft includes: an outer race forming a plurality of outer ball tracks; an inner race forming a plurality of inner ball tracks corresponding to the plurality of the outer ball tracks; a ball cage interposed between the outer race and the inner race and forming a plurality of windows; and a plurality of torque transmitting balls respectively disposed in spaces formed by the pairs of the outer and inner ball tracks in a state of being respectively housed in the windows. The outer race and the inner race are configured to implement an angular articulation function that allows for relative angular displacement therebetween, and the inner race is coupled to the interconnecting shaft via a ball spline coupling structure to implement a length displacement function through relative axial displacement along an axial direction of the interconnecting shaft. The ball spline coupling structure includes: an outer spline groove provided on the inner race; an inner spline groove provided on the interconnecting shaft corresponding to the outer spline groove; a sleeve member interposed between the inner race and the interconnecting shaft; and a plurality of spline balls disposed in a space formed by a pair of the outer and inner spline grooves, with said spline balls being accommodated within a sleeve window formed on the sleeve member.

The spline balls may be arranged to form a row, and the row of the spline balls is positioned to overlap with the torque transmitting ball along the axial direction of the interconnecting shaft when the joint is in a non-articulated state.

The torque transmitting balls may be provided in eight.

The outer ball tracks may include a first outer ball track and a second outer ball track, and the inner ball tracks may include a first inner ball track paired with the first outer ball track and a second inner ball track paired with the second outer ball track. A pair of the first outer ball track and the first inner ball track and a pair of the second outer ball track and the second inner ball track may be configured to have opening angles in opposite directions in a non-articulated state.

The outer race and the inner race may be configured to allow axial relative displacement due to a clearance between the outer race and the inner race.

A driveshaft configured to transmit rotational driving force according to an embodiment of the present invention includes: an interconnecting shaft; and a constant velocity joint coupled to the interconnecting shaft. The constant velocity joint includes: an outer race forming a plurality of outer ball tracks; an inner race forming a plurality of inner ball tracks corresponding to the plurality of the outer ball tracks; a ball cage interposed between the outer race and the inner race and forming a plurality of windows; and a plurality of torque transmitting balls respectively disposed in spaces formed by the pairs of the outer and inner ball tracks in a state of being respectively housed in the windows. The outer race and the inner race are configured to implement an angular articulation function that allows for relative angular displacement therebetween, and the inner race is coupled to the interconnecting shaft via a ball spline coupling structure to implement a length displacement function through relative axial displacement along an axial direction of the interconnecting shaft. The ball spline coupling structure includes: an outer spline groove provided on the inner race; an inner spline groove provided on the interconnecting shaft corresponding to the outer spline groove; a sleeve member interposed between the inner race and the interconnecting shaft; and a plurality of spline balls disposed in a space formed by a pair of the outer and inner spline grooves, with said spline balls being accommodated within a sleeve window formed on the sleeve member. The sleeve window is formed to extend longitudinally in a direction parallel to the axial direction of the interconnecting shaft. The plurality of the spline balls are arranged to be adjacent to each other in contact, thereby forming a row within the sleeve window.

The inner race may have a through hole, and one end of the interconnecting shaft may be movably inserted into the through hole. The outer spline groove may be formed on an inner circumferential surface of the inner race that forms the through hole and the inner spline groove may be formed on an outer circumferential surface of the interconnecting shaft to face the outer spline groove.

The outer race may have a coupling side and an open side, and the interconnecting shaft may be configured to perform a moving-out movement away from the coupling side and a moving-in movement toward the coupling side through the ball spline coupling structure. The ball spline coupling structure may include: a first movement limiting part provided at one end portion of the inner race to restrict movement of the spline balls during the moving-out movement of the interconnecting shaft; a second movement limiting part provided at an end portion of the interconnecting shaft to restrict movement of the spline balls during the moving-out movement of the interconnecting shaft; and a third movement limiting part provided at the other end of the inner race to restrict movement of the spline balls during the moving-in movement of the interconnecting shaft.

The outer race may include a coupling side and an open side, and the interconnecting shaft may be configured to perform a moving-out movement away from the coupling side and a moving-in movement toward the coupling side through the ball spline coupling structure. The ball spline coupling structure may include: a first movement limiting part provided at one end portion of the inner race to restrict movement of the spline balls during the moving-out movement of the interconnecting shaft; a second movement limiting part provided at an end portion of the interconnecting shaft to restrict movement of the spline balls during the moving-out movement of the interconnecting shaft; and a third movement limiting part provided at the other end of the inner race to restrict movement of the spline balls during the moving-in movement of the interconnecting shaft. The first to third movement limiting parts may be configured to directly contact the spline balls, without contacting the sleeve member, to limit movement of the spline ball.

The interconnecting shaft may have a solid structure.

The outer ball tracks may include a first outer ball track and a second outer ball track, and the inner ball tracks may include a first inner ball track paired with the first outer ball track, and a second inner ball track paired with the second outer ball track. A pair of the first outer ball track and the first inner ball track and a pair of the second outer ball track and the second inner ball track may be configured to have opening angles in opposite directions in a non-articulated state.

The torque transmitting balls may be provided in eight.

A driveshaft configured to transmit rotational driving force according to an embodiment of the present invention includes: an interconnecting shaft; and a constant velocity joint coupled to the interconnecting shaft. The constant velocity joint includes: an outer race forming a plurality of outer ball tracks; an inner race forming a plurality of inner ball tracks corresponding to the plurality of the outer ball tracks; a ball cage interposed between the outer race and the inner race and forming a plurality of windows; and a plurality of torque transmitting balls respectively disposed in spaces formed by the pairs of the outer and inner ball tracks in a state of being respectively housed in the windows. The outer race and the inner race are configured to implement an angular articulation function that allows for relative angular displacement therebetween, and the inner race is coupled to the interconnecting shaft via a ball spline coupling structure to implement a length displacement function through relative axial displacement along an axial direction of the interconnecting shaft. The outer race and the inner race are configured to allow axial relative displacement due to a clearance between the outer race and the inner race.

According to the present invention, by connecting the inner race and the interconnecting shaft through a ball spline coupling structure to provide axial length displacement functionality, the diameter and weight of the interconnecting shaft can be reduced. Additionally, this allows for the simplification of the manufacturing process and a reduction in production costs.

In addition, various effects that can be obtained or anticipated as a result of the embodiments of this invention are disclosed, either explicitly or implicitly, in the detailed description of the embodiments of the invention.

BRIEF DESCRIPTION OF THE DRAWINGS

The accompanying drawings provided below are intended to aid in the understanding of the present invention and, along with the detailed description, offer embodiments of the invention. However, the technical features of the invention are not limited to the specific drawings, and the features disclosed in each drawing may be combined to form new embodiments. The embodiments described in this specification can be better understood by referring to the following description in connection with the accompanying drawings, where similar reference numerals indicate the same or functionally similar elements.

FIG. 14 is a cross-sectional view showing a ball spline coupling structure applied to an inner race of a constant velocity joint according to an embodiment of the present invention.

The drawings referenced above are not necessarily drawn to scale and should be understood as simplified representations that illustrate various features of the basic principles of the invention. For example, certain design features of the invention, including specific dimensions, orientations, posi-tions, and shapes, will be partially determined by the par-ticular intended application and usage environment.

DETAILED DESCRIPTION OF THE INVENTION

The following detailed description of the embodiments of the present invention is provided with reference to the accompanying drawings so that those skilled in the art can easily implement the invention. However, the present inven-tion can be implemented in various different forms and is not limited to the described embodiments.

The terms used in this specification are intended solely for the purpose of describing specific embodiments and are not intended to limit the invention. As used herein, the singular form is intended to include the plural form as well, unless the context clearly indicates otherwise. The terms "includes" and/or "including," as used in this specification, indicate the presence of the stated features, elements, steps, operations, components, and/or combinations thereof, but do not pre-clude the presence or addition of one or more other features, elements, steps, operations, components, and/or groups thereof. As used herein, the term "and/or" includes any and all combinations of one or more of the associated listed items. The term "coupled" refers to the physical relationship between two components, indicating that the components are either directly connected to each other or indirectly connected through one or more intermediary components.

In describing the components of the present invention, terms such as first, second, A, B, (a), (b), etc., may be used. These terms are merely for distinguishing one component from another and do not limit the nature, order, or sequence of the components. When a component is described as being "connected," "coupled," or "linked" to another component, it can be directly connected, coupled, or linked to that component, but it should also be understood that another component may be "connected," "coupled," or "linked" in between them.

Figure 1:
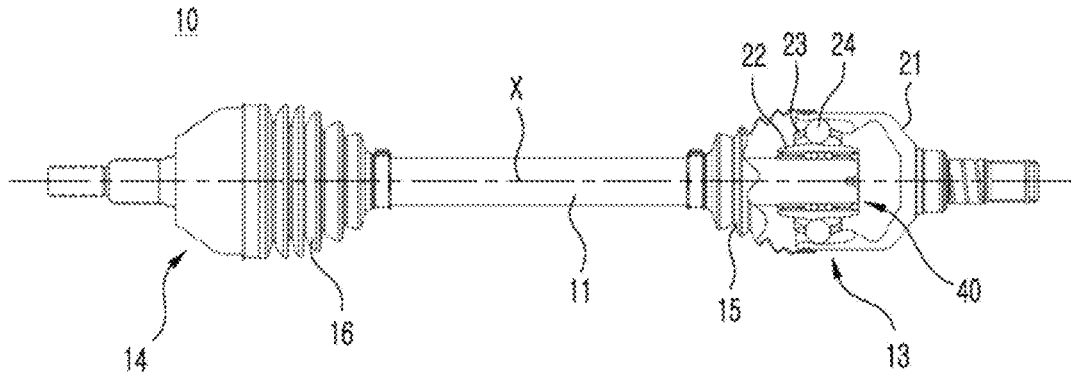
FIG. 1 illustrates a driveshaft with a constant velocity joint according to an embodiment of the present invention.

FIG. 1 shows a driveshaft 10 with a constant velocity joint 13 applied according to an embodiment of the present invention. Referring to FIG. 1, the driveshaft 10 includes an interconnecting shaft 11 and a pair of constant velocity joints 13 and 14 respectively coupled to both ends of the inter-connecting shaft 11. The interconnecting shaft 11 may be formed as either a solid or hollow shaft, depending on the requirements.

The constant velocity joints 13 and 14 can either be a fixed type constant velocity joint, which does not have axial displacement functionality, or a plunging type constant velocity joint, which has axial displacement functionality. For example, the constant velocity joints 13 and 14 may be the fixed type joint that either do not have axial displacement functionality or allow limited axial displacement due to clearance, such as a Rzeppa joint type constant velocity joint. One of the constant velocity joints 13 and 14 can be used as an inboard joint, while the other can be used as an outboard joint. For instance, the constant velocity joint indicated by reference numeral 13 in this embodiment of the invention may be used as the inboard joint, and the constant velocity joint indicated by reference numeral 14 may be used as the outboard joint. In FIG. 1, the constant velocity joint 13 is shown in a partially cutaway view.

The constant velocity joint 13 and 14 can be respectively equipped with boots 15 and 16 for grease sealing. Both ends of boot 15 can be secured to the constant velocity joint 13 and the interconnecting shaft 11, respectively, by fastening means such as a ring clamp. Similarly, both ends of boot 16 can be secured to the constant velocity joint 14 and the interconnecting shaft 11, respectively, by fastening means such as a ring clamp.

Figure 2:
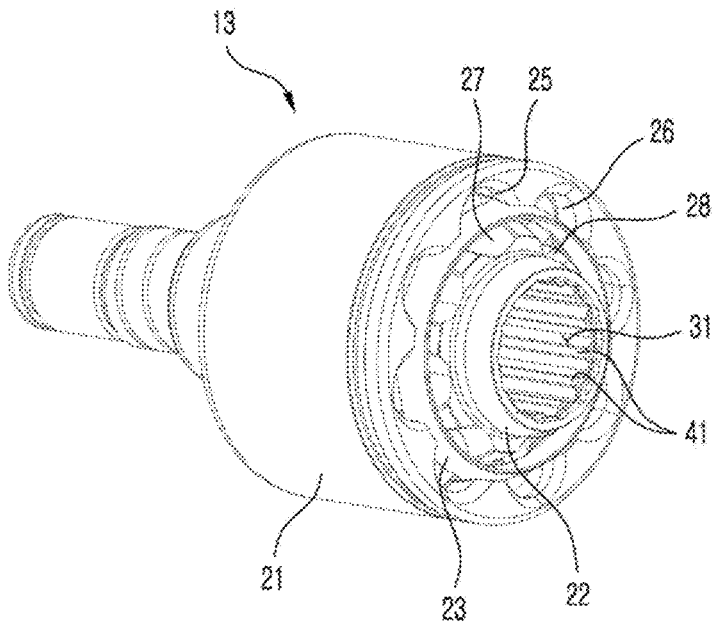
FIG. 2 is a perspective view of the constant velocity joint according to an embodiment of the present invention.
Figure 3:
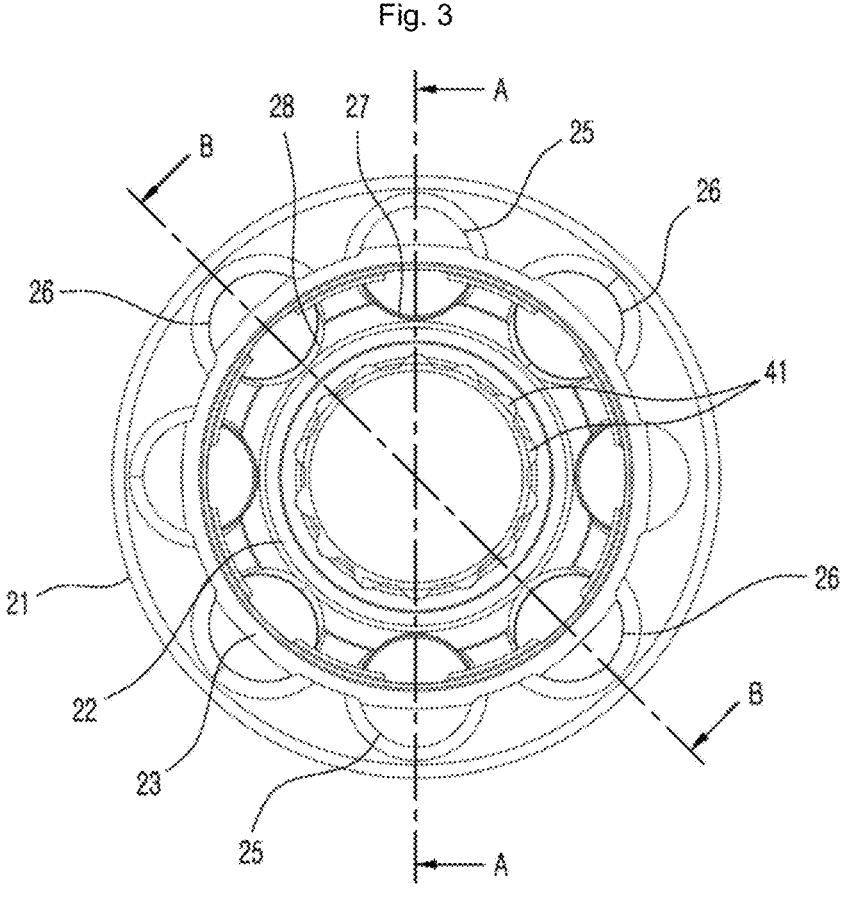
FIG. 3 is a front view of a constant velocity joint according to an embodiment of the present invention.
Figure 8:
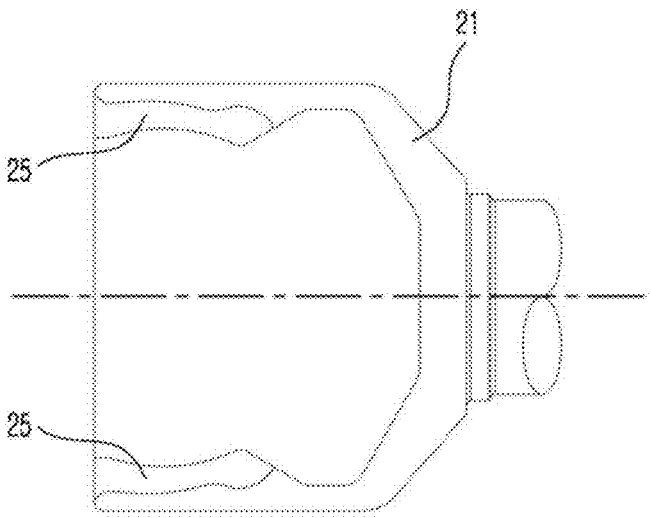
FIG. 8 is a cross-sectional view of an outer race of a constant velocity joint according to an embodiment of the present invention.

FIG. 2 is a perspective view of the constant velocity joint according to an embodiment of the present invention, and FIG. 3 is a front view of the constant velocity joint according to the same embodiment. FIG. 8 is a cross-sectional view of the outer race of the constant velocity joint according to the embodiment of the present invention. Referring to FIGS. 2, 3, and 8, the constant velocity joint 13 includes an outer race 21, an inner race 22, a ball cage 23, and torque transmitting ball 24. The outer race 21 may have a generally U-shaped configuration with one side open and is designed to receive power from a power source.

The outer race 21 may have a coupling side of a closed structure and an open side formed on the opposite end of the coupling side, and the coupling side can be connected to a power source. In FIG. 8, the right part corresponds to the coupling side, and the left part corresponds to the open side. The inner race 22 and the ball cage 23 are inserted into the internal space of the outer race 21 through the open side.

The inner race 22 is positioned within the internal space of the outer race 21. The inner race 22 is connected to the interconnecting shaft 11 in a manner that allows the transmission of rotational power to the interconnecting shaft 11. The power transmission between the inner race 22 and the interconnecting shaft 11 is achieved through a ball spline coupling structure 40, which will be described later.

Figure 20:
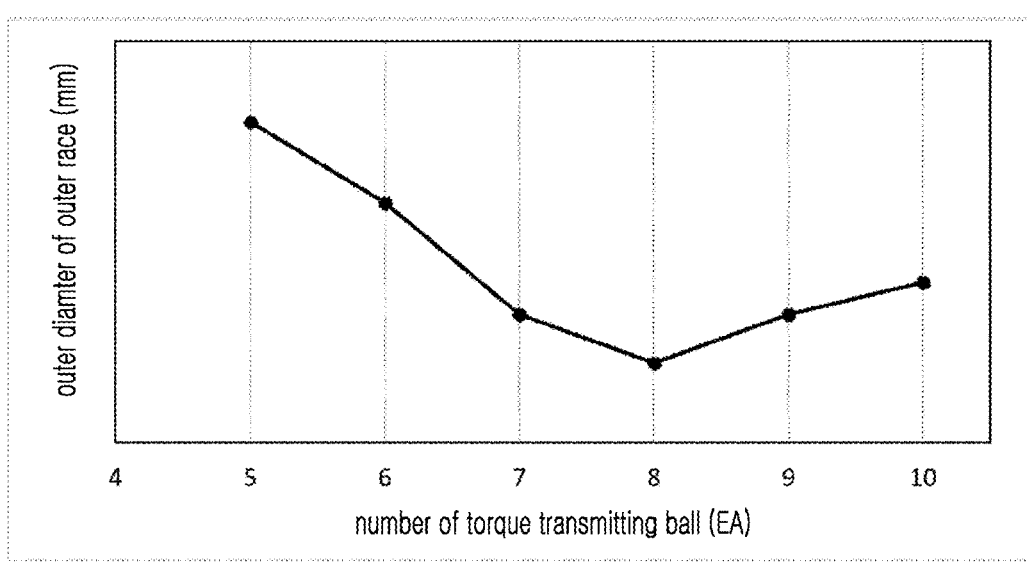
FIG. 20 is a graph showing an outer diameter of an outer race required to achieve optimal durability performance based on the number of torque transmitting balls, i.e., the numbers of outer and inner ball tracks.

The outer race 21 forms outer ball tracks 25 and 26 on its inner circumferential surface, while the inner race 22 forms inner ball tracks 27 and 28 on its outer circumferential surface. The outer ball tracks 25 and 26 and the inner ball tracks 27 and 28 are formed in corresponding positions, and torque transmitting balls 24 are positioned in the spaces formed by the pairs of corresponding outer and inner ball tracks 25 and 27, and 26 and 28. Through these torque transmitting balls 24, rotational power can be transmitted between the outer race 21 and the inner race 22. For example, the constant velocity joint may include eight torque transmitting balls 24, which are preferably arranged at equal intervals along the circumferential direction. However, the number of torque transmitting ball 24 is not limited to eight; it could be six, ten, or another number. Eight torque transmitting ball 24 are particularly preferred. FIG. 20 presents a graph showing the outer diameter of the outer race in relation to the number of torque transmitting balls, or more specifically, the number of outer and inner ball tracks, for achieving optimal durability performance. The outer diameter of the outer race was calculated based on optimizing the Hertzian contact stress, a theoretical measure of durability performance. The results indicate that when the number of torque transmitting balls is eight, the outer diameter of the outer race can be minimized. This is because exceeding eight balls requires increasing internal dimensions to satisfy Hertzian contact stress requirements, which in turn necessitates increasing the outer diameter of the outer race, leading to undesirable effects.

Figure 9:
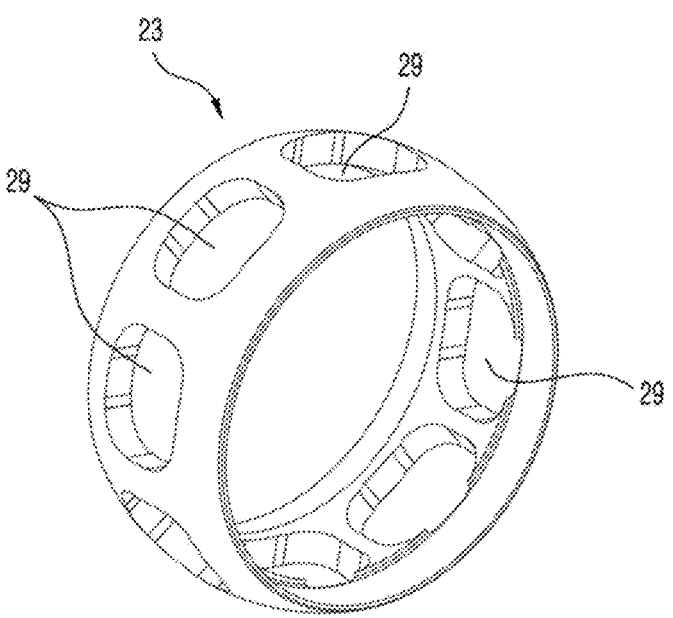
FIG. 9 is a perspective view of a ball cage of a constant velocity joint according to an embodiment of the present invention.

Referring to FIGS. 3 and 9, the ball cage 23 is interposed between the inner circumferential surface of the outer race 21 and the outer circumferential surface of the inner race 22. The ball cage 23 may include a plurality of windows 29, each of which accommodates the torque transmitting ball 24. For example, the outer and inner circumferential surfaces of the ball cage 23 can be formed as spherical surfaces.

Figure 4:
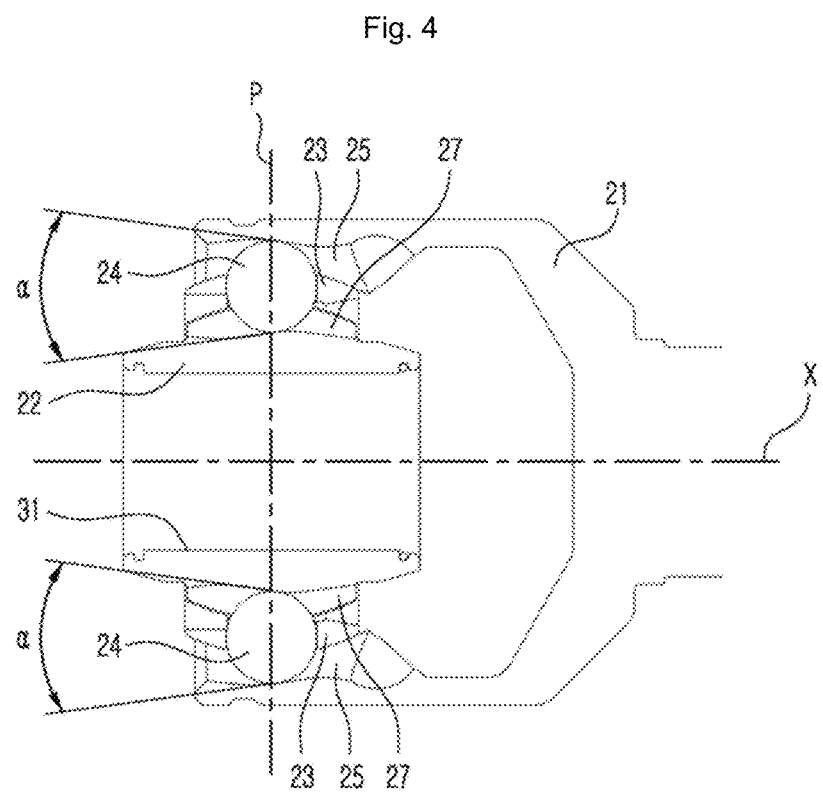
FIG. 4 is a cross-sectional view taken along line A-A of FIG. 3.
Figure 5:
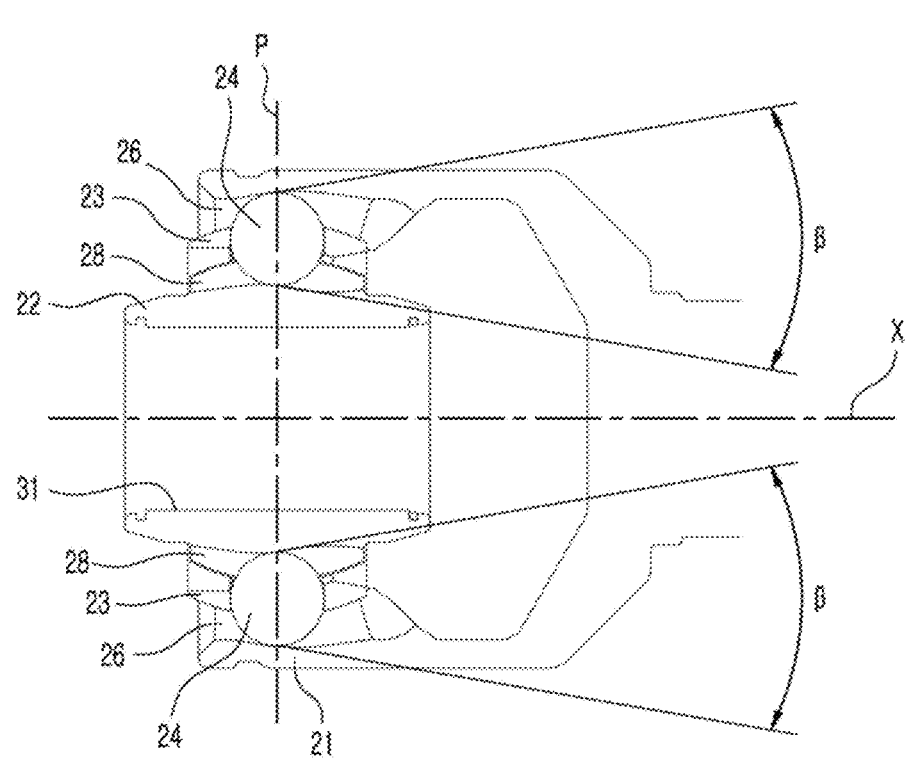
FIG. 5 is a cross-sectional view taken along line B-B of FIG. 3.

FIG. 4 is a cross-sectional view taken along line A-A of FIG. 3, and FIG. 5 is a cross-sectional view taken along line B-B of FIG. 3. Referring to FIGS. 4 and 5, the pair of the outer ball track 25 and the inner ball track 27 form an opening angle α oriented toward the open side, while the pair of the outer ball track 26 and the inner ball track 28 form an opening angle β oriented toward the coupling side. The pair of the outer and inner ball tracks 25 and 27 with an opening angle α toward the open side and the pair of the outer and inner ball tracks 26 and 28 with an opening angle β toward the coupling side may be arranged alternately along the circumferential direction. In this regard, the concept of the opening angle is generally known in the technical field to which the present invention belongs and may refer to the angle formed between the central trajectory of the ball moving along the outer ball track and the central trajectory of the ball moving along the inner ball track. A constant velocity joint with opening angles oriented in opposite directions in a non-articulated state, as described here, is known as a counter ball track joint. This design minimizes the deviation of the ball cage 23 when torque is applied, enabling the ball cage 23 to self-center and reduce internal friction. This reduction in friction minimizes the loss of output torque relative to input torque in the constant velocity joint, which can contribute to improved fuel efficiency or energy efficiency of vehicles.

Figure 6:
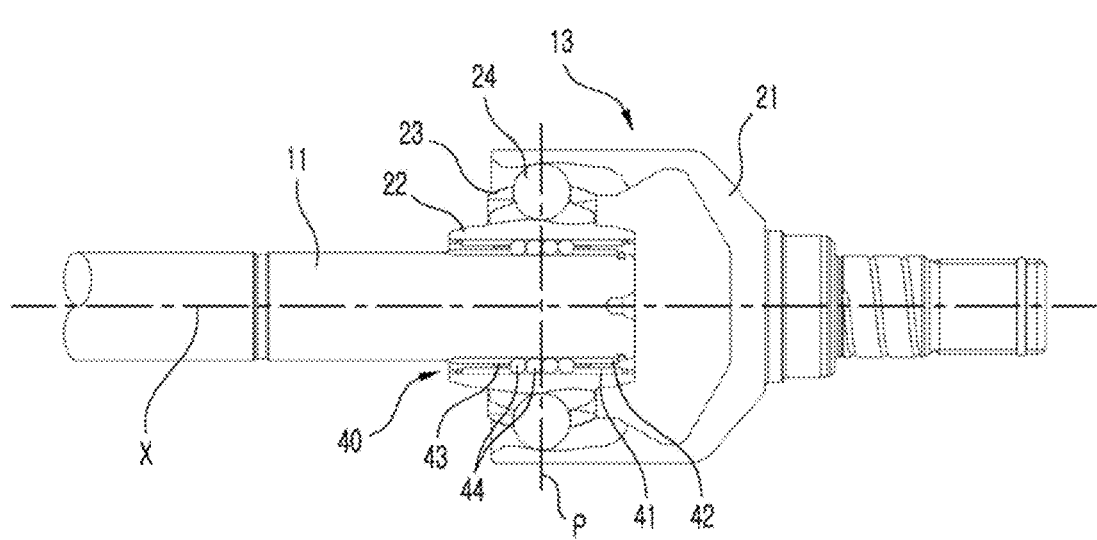
FIG. 6 is a partial cross-sectional view of a constant velocity joint according to an embodiment of the present invention.
Figure 7:
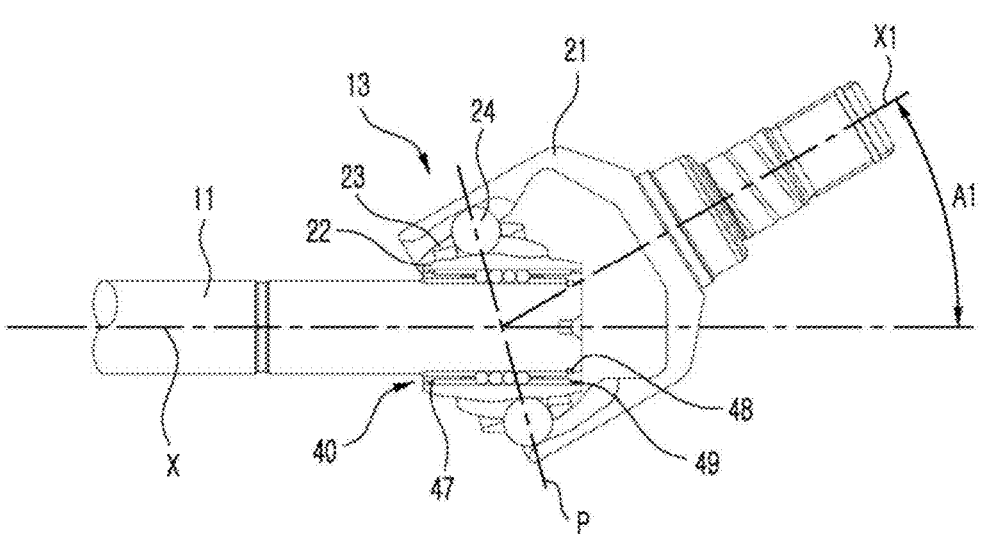
FIG. 7 is a partial cross-sectional view showing an inner race in an articulated state relative to an outer race in a constant velocity joint according to an embodiment of the present invention.

The constant velocity joint 13 according to an embodiment of the present invention can be configured to allow relative angular displacement between the outer race 21 and the inner race 22, i.e., to perform an angular articulation function. For example, the outer race 21, inner race 22, and ball cage 23 may be configured in the form of a Rzeppa joint, which allows for relative angular displacement between the outer race 21 and the inner race 22. FIG. 6 illustrates the aligned state, or non-articulated state, where the outer race 21 and inner race 22 are in alignment. In contrast, FIG. 7 shows the articulated state, where the inner race 22 is articulated relative to the outer race 21. The articulation angle A1 shown in FIG. 7 represents the angle formed between the axial direction X1 of the constant velocity joint 13 and the axial direction X of the driveshaft 10, specifically the interconnecting shaft 11.

The constant velocity joint 13 according to an embodiment of the present invention is configured so that the angular articulation function and the axial displacement function occur separately. The angular articulation function can be implemented through the shapes of the inner circumferential surface of the outer race 21, the outer circumferential surface of the inner race 22, and the ball cage 23, as described above. On the other hand, the axial displacement function, which allows for length change along the axial direction X of the driveshaft 10, is achieved through the ball spline coupling structure between the inner race 22 and the interconnecting shaft 11.

In an embodiment of the present invention, the axial displacement function is implemented through the ball spline coupling structure between the inner race 22 and the interconnecting shaft 11, and as a result, there is no need to configure the interconnecting shaft as a tubular shaft, as in conventional designs, and the outer diameter of the interconnecting shaft can be significantly reduced to be close to that of a solid shaft without the axial displacement function. In this regard, the interconnecting shaft 11 can be applied as a solid shaft. The reduction in the outer diameter of the interconnecting shaft enhances the flexibility in the design of the vehicle's interior space. Additionally, by implementing the axial displacement function through the ball spline coupling structure between the inner race 22 and the interconnecting shaft 11, the overall weight is reduced compared to a conventional tubular shaft with axial displacement function, and manufacturing costs are significantly lowered. Moreover, the application of the ball spline coupling structure substantially reduces the generated axial force (GAF) in the vehicle, thereby offering superior NVH (Noise, Vibration, and Harshness) performance compared to the conventional constant velocity joint.

Figure 10:
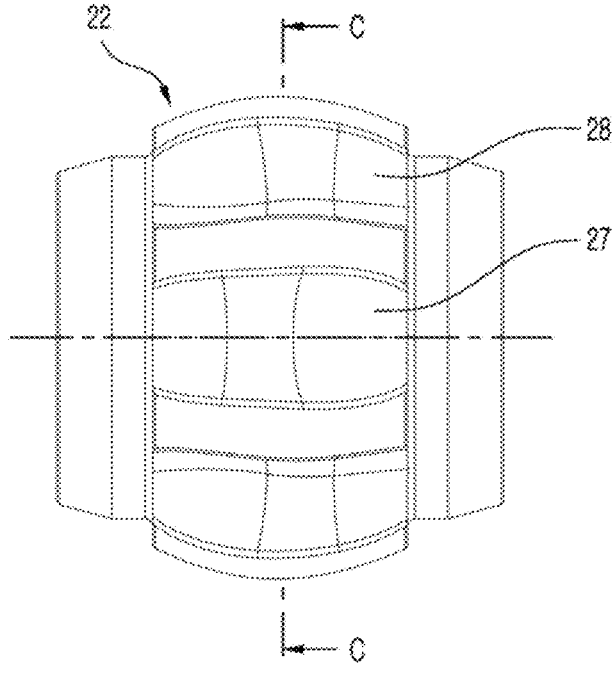
FIG. 10 is a side view of an inner race according to an embodiment of the present invention.
Figure 11:
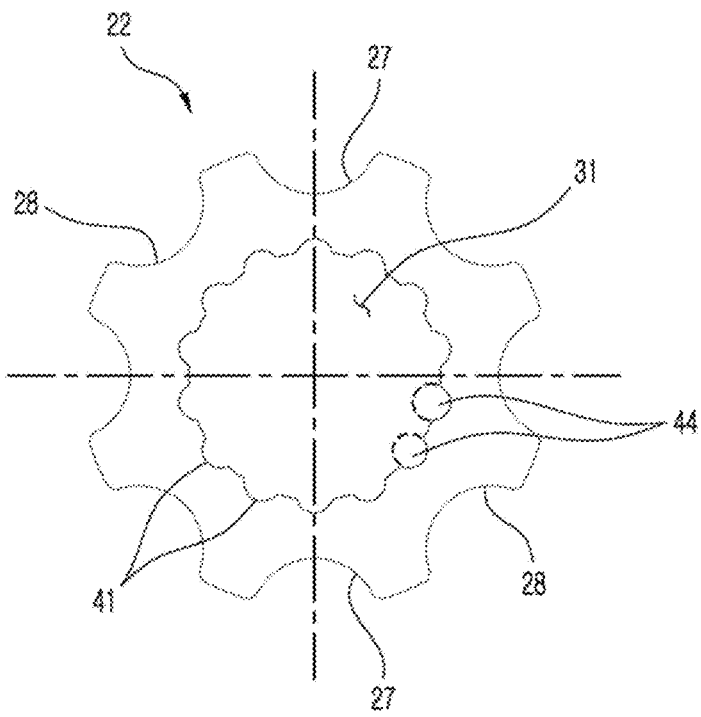
FIG. 11 is a cross-sectional view taken along line C-C of FIG. 10.

FIG. 10 is a side view of the inner race according to an embodiment of the present invention, and FIG. 11 is a cross-sectional view taken along line C-C of FIG. 10. The inner race 22 forms a through hole 31 that extends in the axial direction, and inner ball tracks 27 and 28 of recessed groove-shape are formed on the outer circumferential surface of the inner race 22.

The inner race 22 and the interconnecting shaft 11 are coupled to each other through the ball spline coupling structure 40 that enables the transmission of rotational power while allowing axial relative displacement. The ball spline coupling structure 40 includes a plurality of outer spline grooves 41, a plurality of inner spline grooves 42, a sleeve member 43, and a plurality of rows of spline balls 44. Here, the row of spline balls 44 may be positioned to overlap with the torque transmitting balls 24 along the axial direction of the constant velocity joint when the joint is in a non-articulated state. As shown in FIG. 11, the outer spline grooves 41 are formed on an inner circumferential surface defining the through hole 31 of the inner race 22, and the inner spline grooves 42 are correspondingly formed on an outer circumferential surface of the interconnecting shaft 11. The outer and inner spline grooves 41 and 42 form a pair to create a space into which the row of spline balls 44 are inserted. The outer and inner spline grooves 41 and 42 extend in a direction parallel to the axial direction X of the interconnecting shaft 11, and the spline balls 44 are designed to roll and/or slide within the space formed by the pair of the outer and inner spline grooves 41 and 42. The rolling and/or sliding of the spline balls 44 facilitates axial relative displacement between the inner race 22 and the interconnecting shaft 11, which in turn leads to a change in the axial length of the driveshaft 10. The outer and inner spline grooves 41 and 42 may have cross-sectional shapes such as an arch or Gothic arch, allowing the spline balls 44 to contact the sides of the grooves. This contact ensures that the inner race 22 and the interconnecting shaft 11 rotate together around the axial direction X.

Figure 12:
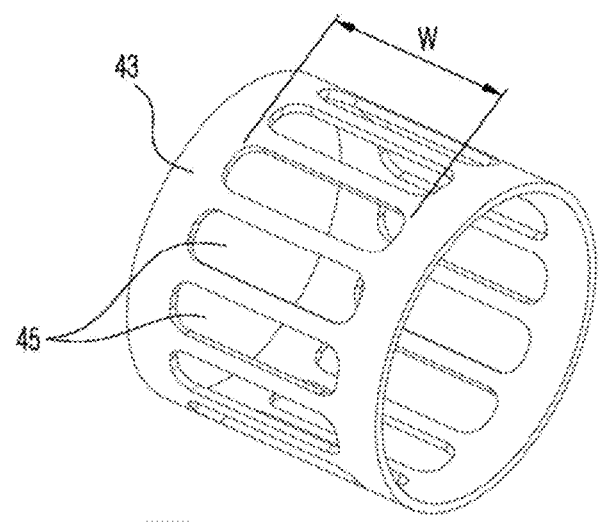
FIG. 12 is a perspective view of a sleeve of a constant velocity joint according to an embodiment of the present invention.
Figure 13:
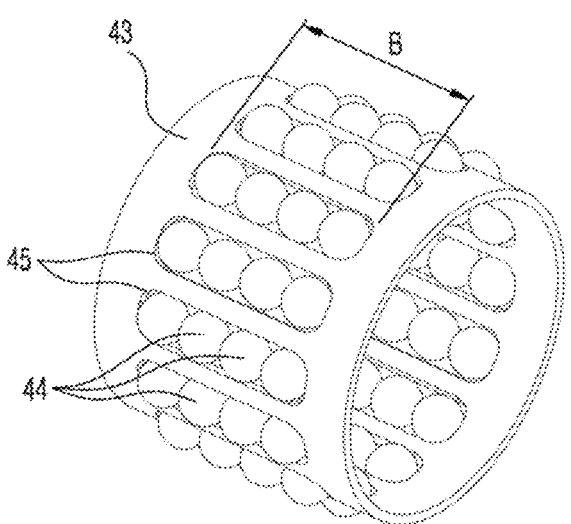
FIG. 13 is a perspective view showing a sleeve with balls assembled in a constant velocity joint according to an embodiment of the present invention.

FIG. 12 is a perspective view of the sleeve of the constant velocity joint according to an embodiment of the present invention, and FIG. 13 is a perspective view showing the sleeve with the balls assembled in the constant velocity joint according to the same embodiment. Referring to FIGS. 12 and 13, the sleeve member 43 may have a hollow cylindrical shape with thin walls, allowing it to be interposed in the space between the outer circumferential surface of the interconnecting shaft 11 and the inner circumferential surface of the inner race 22. The sleeve member 43 is equipped with a plurality of sleeve windows 45, each of which accommodates a row of spline balls 44. The sleeve windows 45 may be arranged at equal intervals along the circumferential direction. Each sleeve window 45 extends in a direction parallel to the axial direction X of the interconnecting shaft 11. The radially outer portions of the spline balls 44 housed in the sleeve window 45 are received in the outer spline groove 41, while the radially inner portions thereof are received in the inner spline groove 42.

Figure 14:
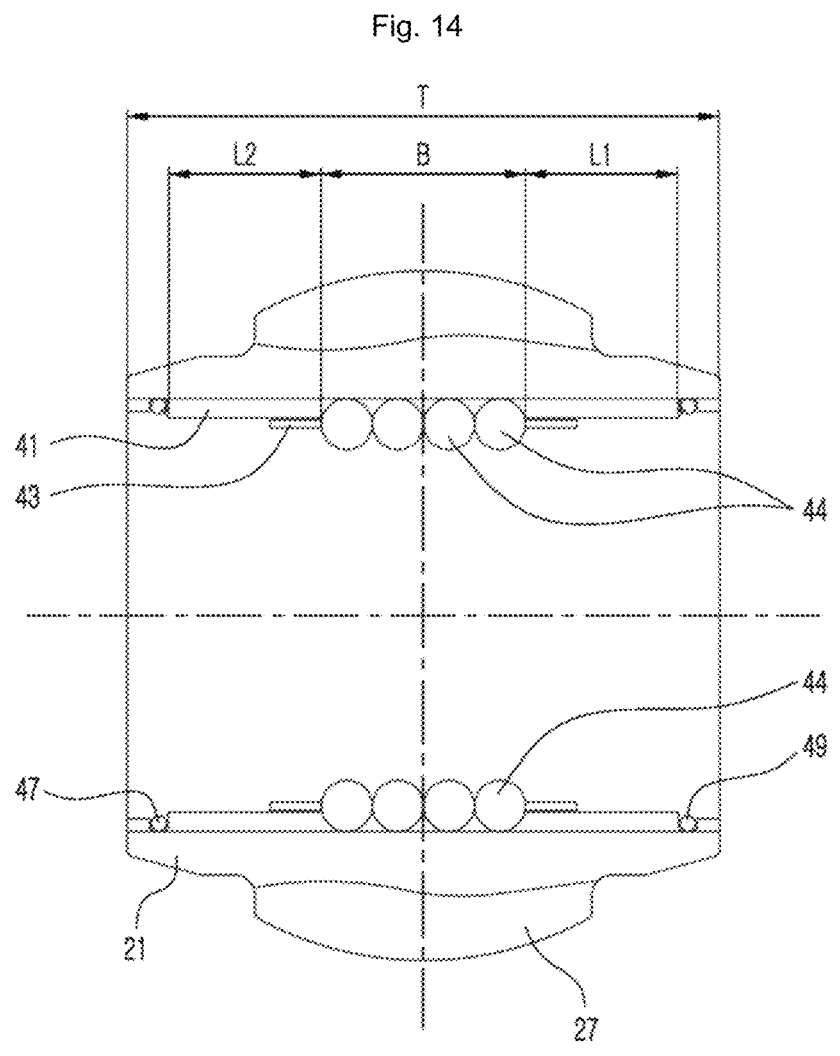

Referring to FIGS. 11, 12, and 13, a plurality of spline balls 44 arranged in a row are housed in each sleeve window 45, with adjacent spline balls 44 being able to make contact with each other. The sleeve window 45 may be formed as an elongated slot with a consistent width W. Since the plurality of spline balls 44 are arranged in a single long sleeve window 45 to form a row, the overall length B of the row of spline balls is reduced. This reduction in length leads to a shorter ball spline coupling structure 40, allowing for the implementation of a more compact constant velocity joint. As shown in FIG. 14, the reduced length B of the row of spline balls 44 enables the overall length T of the inner race 22 to be minimized while still meeting the required axial displacement amounts L1 and L2.

Figure 19:
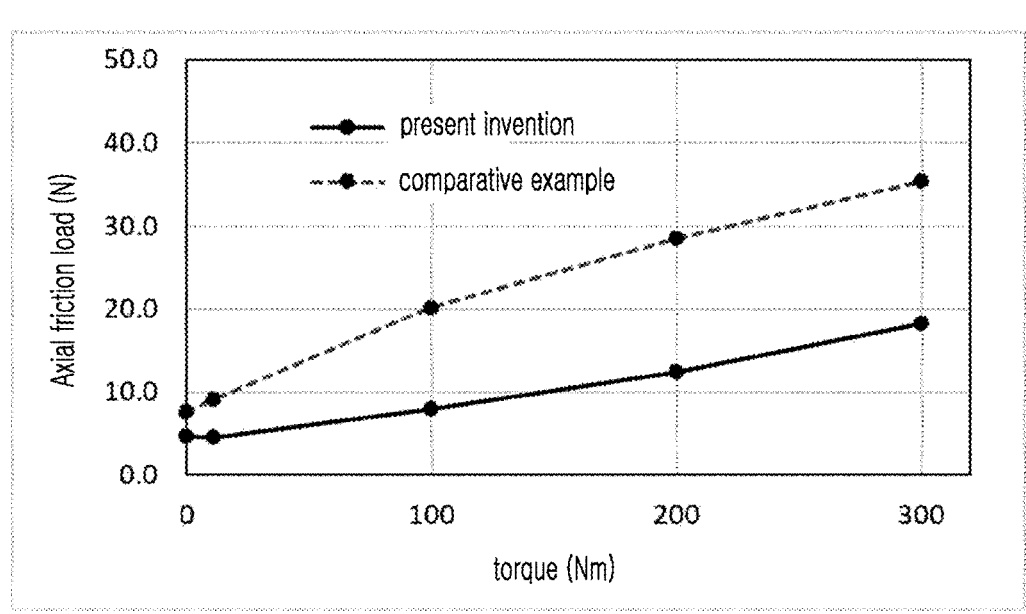
FIG. 19 is a diagram comparatively showing the axial friction load between a constant velocity joint according to an embodiment of the present invention and a conventional constant velocity joint.

In this embodiment of the invention, since the plurality of spline balls 44 arranged in a row are accommodated together within the single elongated sleeve window 45, when the spline balls 44 slide and/or roll, they come into contact with each other, which leads to a reduction in friction. FIG. 19 illustrates the results of an axial friction test comparing the case where the plurality of spline balls 44 are housed together in a single sleeve window 45, as in the present invention (shown as a solid line), with a comparative example where each spline ball is independently housed in separate sleeve window (shown as a dashed line). As depicted in FIG. 19, the embodiment of the present invention shows a significant reduction in axial friction load.

Figure 15:
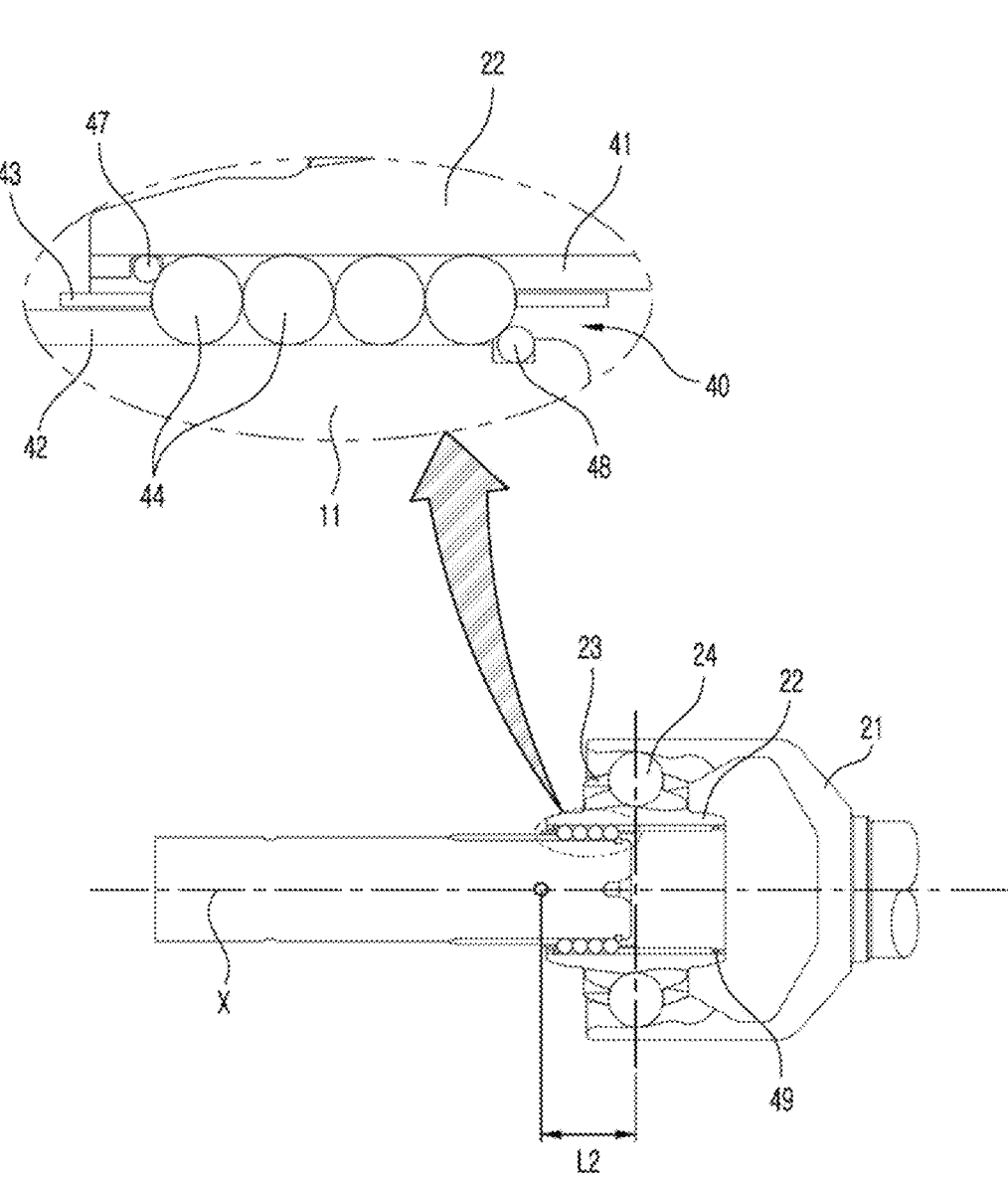
FIG. 15 is a diagram showing the state in which a interconnecting shaft has relatively moved in a moving-out direction with respect to an inner race from the state shown in FIG. 6.
Figure 16:
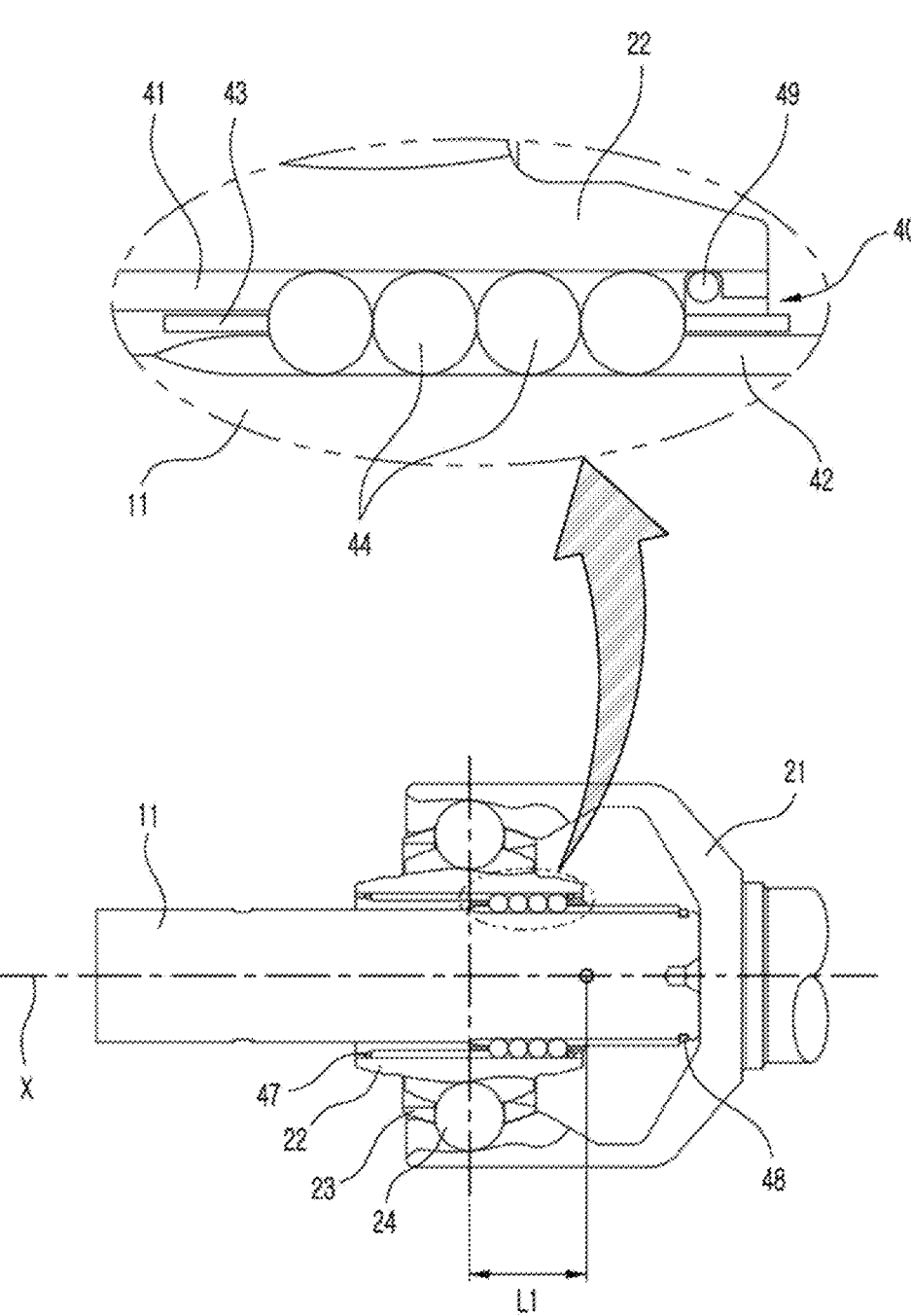
FIG. 16 is a diagram showing the state in which a interconnecting shaft has relatively moved in a moving-in direction with respect to an inner race from the state shown in FIG. 6.

FIG. 15 shows the state where the interconnecting shaft has moved in the moving-out direction relative to the inner race from the state shown in FIG. 6, and FIG. 16 shows the state where the interconnecting shaft has moved in the moving-in direction relative to the inner race from the state shown in FIG. 6. In FIG. 6, the center of the row of spline balls 44 of the ball spline coupling structure 40 is aligned with the joint center plane P. When the interconnecting shaft 11 moves from the position in FIG. 6 toward the open side of the outer race 21, that is, in the moving-out direction (to the left in FIG. 15), it reaches the state shown in FIG. 15. Conversely, when it moves toward the coupling side of the outer race 21, that is, in the moving-in direction (to the right in FIG. 16), it reaches the state shown in FIG. 16. FIG. 15 shows the state where the interconnecting shaft has moved to the maximum extent in the moving-out direction, and FIG. 16 shows the state where it has moved to the maximum extent in the moving-in direction. The maximum moving distance in the moving-out direction L2 and the maximum moving distance in the moving-in direction L1, relative to the position in FIG. 6, correspond to the respective displacement length shown in FIG. 14. Through this ball spline coupling structure 40, a driveshaft with a defined total length displacement (=L1+L2) can be implemented.

To limit the range of movement of the interconnecting shaft 11 during its moving-out and moving-in behaviors and to prevent the spline balls 44 and the sleeve member 43 from dislodging, a specific structure is applied. Referring to FIGS. 6 and 15, a first movement limiting part, i.e., a first retaining ring 47, and a second movement limiting part, i.e., a second retaining ring 48, are provided to restrict the movement of the spline balls 44 during the moving-out behavior of the interconnecting shaft 11. The first retaining ring 47 is installed on the inner circumferential surface at one end of the inner race 22 and is configured to support the outermost spline ball 44, thereby preventing the spline balls 44 from dislodging from the inner race 22. On the other hand, the second retaining ring 48 is installed on the outer circumferential surface at an end of the interconnecting shaft 11 and is also configured to support the outermost spline ball 44, preventing it from dislodging from the interconnecting shaft 11. When the interconnecting shaft 11 moves to its maximum extent in the moving-out direction, as shown in FIG. 15, both ends of the row of spline balls 44 are supported by the first retaining ring 47 and the second retaining ring 48, respectively. This setup ensures that, on one hand, the spline balls 44 and the sleeve member 43 are prevented from dislodging from the inner race 22, and on the other hand, it restricts the moving-out movement of the interconnecting shaft 11.

Referring to FIGS. 6 and 16, a third movement limiting part, i.e., a third retaining ring 49, is provided to restrict the movement of the spline balls 44 during the moving-in behavior of the interconnecting shaft 11. The third retaining ring 49 is installed on the inner circumferential surface at the opposite end of the inner race 22 and is configured to support the outermost spline ball 44, thereby preventing the spline balls 44 from dislodging from the inner race 22. When the interconnecting shaft 11 moves to its maximum extent in the moving-in direction, as shown in FIG. 16, one end of the row of spline balls 44 is supported by the third retaining ring 49. This setup ensures that during the moving-in behavior, the spline balls 44 and the sleeve member 43 are prevented from dislodging from the inner race 22.

As shown in FIGS. 15 and 16, the first to third retaining rings 47, 48, and 49 are configured to contact the spline balls 44 without touching the sleeve member 43. This design prevents the sleeve member 43 from colliding with and being damaged by the retaining rings 47, 48, 49. The first to third retaining rings 47, 48, and 49 described above can be installed by being inserted into grooves. In another embodiment, the retaining rings may be replaced with staking portions formed by a staking process.

Figure 17:
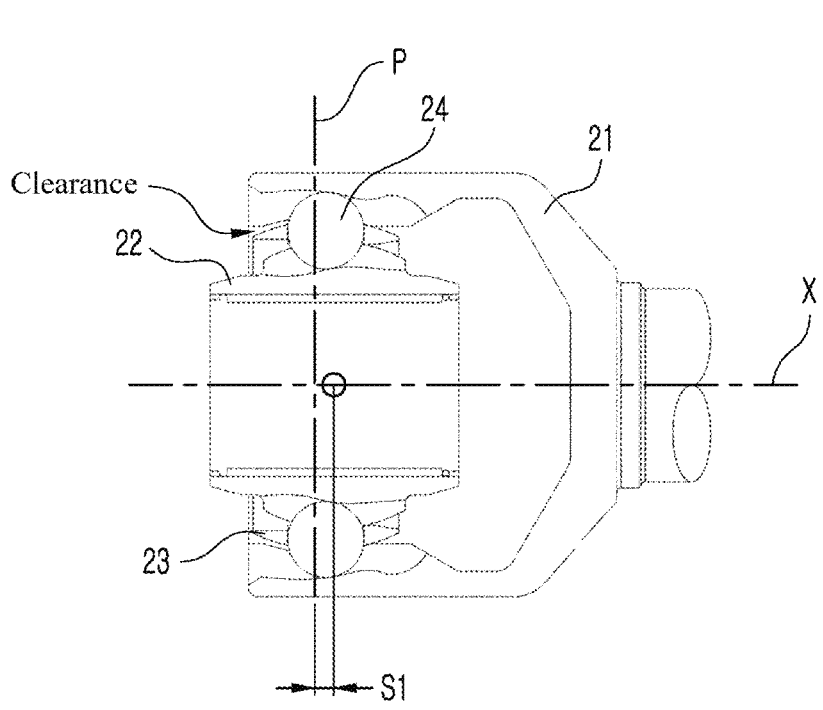
FIG. 17 shows the state in which an inner race has been axially displaced toward a coupling side relative to an outer race in a constant velocity joint according to an embodiment of the present invention.
Figure 18:
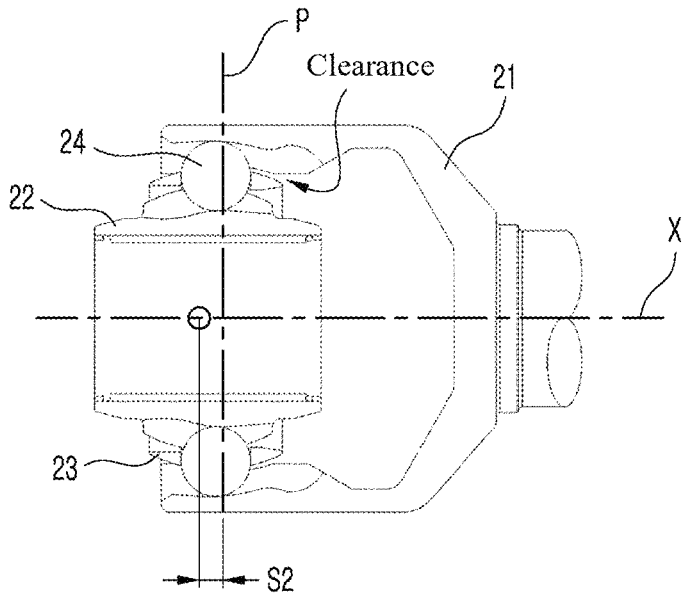
FIG. 18 is a diagram showing the state in which an inner race has been axially displaced toward an open side relative to an outer race in a constant velocity joint according to an embodiment of the present invention.

FIG. 17 illustrates the state where the inner race has been axially displaced toward the coupling side relative to the outer race in the constant velocity joint according to an embodiment of the present invention, and FIG. 18 shows the state where the inner race has been axially displaced toward the open side relative to the outer race. According to the embodiment of the present invention, a clearance is provided between the inner circumferential surface of the outer race 21 and the outer circumferential surface of the ball cage 23, as well as between the inner circumferential surface of the ball cage 23 and the outer circumferential surface of the inner race 22. This clearance allows for axial relative displacement between the outer race 21 and the inner race 22. For example, in FIG. 17, the inner race 22 is shown to be displaced by a length S1 toward the coupling side of the outer race 21 relative to the joint center plane P. In FIG. 18, the inner race 22 is shown to be displaced by a length S2 toward the open side of the outer race 21 relative to the joint center plane P. By setting an appropriate clearance that permits axial relative displacement between the outer race 21 and the inner race 22, part of the required axial displacement can be accommodated through the relative movement of the outer race 21 and inner race 22. This configuration can reduce the maximum axial displacement needed from the ball spline coupling structure 40.

The embodiments of the present invention have been described above; however, the scope of the present invention is not limited to these embodiments. The scope of the present invention includes all modifications and variations that can be easily made by those skilled in the art to which the present invention pertains, and that are considered equivalent to the embodiments of the present invention.

What is claimed is:

1. A constant velocity joint configured to be coupled to an interconnecting shaft of a driveshaft, comprising:
an outer race forming a plurality of outer ball tracks;
an inner race forming a plurality of inner ball tracks corresponding to the plurality of the outer ball tracks;
a ball cage interposed between the outer race and the inner race and forming a plurality of windows; and
a plurality of torque transmitting balls respectively disposed in spaces formed by pairs of the outer and inner ball tracks in a state of being respectively housed in the windows;
wherein the outer race and the inner race are configured to implement an angular articulation function that allows for relative angular displacement therebetween,
wherein the inner race is coupled to the interconnecting shaft via a ball spline coupling structure to implement a length displacement function through relative axial displacement along an axial direction of the interconnecting shaft, and
wherein the ball spline coupling structure comprises:
an outer spline groove provided on the inner race;
an inner spline groove provided on the interconnecting shaft corresponding to the outer spline groove;
a sleeve member interposed between the inner race and the interconnecting shaft; and
a plurality of spline balls disposed in a space formed by a pair of the outer and inner spline grooves, with said spline balls being accommodated within a sleeve window formed on the sleeve member,
wherein the outer race and the inner race are configured to allow axial relative displacement due to a clearance between the outer race and the inner race.

2. The constant velocity joint of claim 1, wherein the spline balls are arranged to form a row, and the row of the spline balls is positioned to overlap with the torque transmitting ball along the axial direction of the interconnecting shaft when the joint is in a non-articulated state.

3. The constant velocity joint of claim 1, wherein the torque transmitting balls are provided in eight.

4. The constant velocity joint of claim 1, wherein the outer ball tracks comprise a first outer ball track and a second outer ball track,
wherein the inner ball tracks comprise a first inner ball track paired with the first outer ball track and a second inner ball track paired with the second outer ball track, and
wherein a pair of the first outer ball track and the first inner ball track and a pair of the second outer ball track and the second inner ball track are configured to have opening angles in opposite directions in a non-articulated state.

5. A driveshaft configured to transmit rotational driving force, comprising:
an interconnecting shaft; and
a constant velocity joint coupled to the interconnecting shaft,
wherein the constant velocity joint comprises:
an outer race forming a plurality of outer ball tracks;
an inner race forming a plurality of inner ball tracks corresponding to the plurality of the outer ball tracks;
a ball cage interposed between the outer race and the inner race and forming a plurality of windows; and
a plurality of torque transmitting balls respectively disposed in spaces formed by the pairs of the outer and inner ball tracks in a state of being respectively housed in the windows;
wherein the outer race and the inner race are configured to implement an angular articulation function that allows for relative angular displacement therebetween,
wherein the inner race is coupled to the interconnecting shaft via a ball spline coupling structure to implement a length displacement function through relative axial displacement along an axial direction of the interconnecting shaft, wherein the ball spline coupling structure comprises:

an outer spline groove provided on the inner race;

an inner spline groove provided on the interconnecting shaft corresponding to the outer spline groove;

a sleeve member interposed between the inner race and the interconnecting shaft; and a plurality of spline balls disposed in a space formed by a pair of the outer and inner spline grooves, with said spline balls being accommodated within a sleeve window formed on the sleeve member, wherein the sleeve window is formed to extend longitudinally in a direction parallel to the axial direction of the interconnecting shaft, wherein the plurality of the spline balls are arranged to be adjacent to each other in contact, thereby forming a row within the sleeve window, and wherein the outer race and the inner race are configured to allow axial relative displacement due to a clearance between the outer race and the inner race.

6. The driveshaft of claim 5, wherein the inner race has a through hole, wherein one end of the interconnecting shaft is movably inserted into the through hole, and wherein the outer spline groove is formed on an inner circumferential surface of the inner race that forms the through hole and the inner spline groove is formed on an outer circumferential surface of the interconnecting shaft to face the outer spline groove.

7. The driveshaft of claim 5, wherein the outer race has a coupling side and an open side, wherein the interconnecting shaft is configured to perform a moving-out movement away from the coupling side and a moving-in movement toward the coupling side through the ball spline coupling structure, and wherein the ball spline coupling structure comprises:

a first movement limiting part provided at one end portion of the inner race to restrict movement of the spline balls during the moving-out movement of the interconnecting shaft;

a second movement limiting part provided at an end portion of the interconnecting shaft to restrict movement of the spline balls during the moving-out movement of the interconnecting shaft; and a third movement limiting part provided at the other end of the inner race to restrict movement of the spline balls during the moving-in movement of the interconnecting shaft.

8. The driveshaft of claim 5, wherein the outer race comprises a coupling side and an open side, wherein the interconnecting shaft is configured to perform a moving-out movement away from the coupling side and a moving-in movement toward the coupling side through the ball spline coupling structure, wherein the ball spline coupling structure comprises:

a first movement limiting part provided at one end portion of the inner race to restrict movement of the spline balls during the moving-out movement of the interconnecting shaft;

a second movement limiting part provided at an end portion of the interconnecting shaft to restrict movement of the spline balls during the moving-out movement of the interconnecting shaft; and a third movement limiting part provided at the other end of the inner race to restrict movement of the spline balls during the moving-in movement of the interconnecting shaft, and wherein the first to third movement limiting parts are configured to directly contact the spline balls, without contacting the sleeve member, to limit movement of the spline ball.

9. The driveshaft of claim 5, wherein the interconnecting shaft has a solid structure.

10. The driveshaft of claim 5, wherein the outer ball tracks comprise a first outer ball track and a second outer ball track, wherein the inner ball tracks comprise a first inner ball track paired with the first outer ball track, and a second inner ball track paired with the second outer ball track, and wherein a pair of the first outer ball track and the first inner ball track and a pair of the second outer ball track and the second inner ball track are configured to have opening angles in opposite directions in a non-articulated state.

11. The driveshaft of claim 5, wherein the torque transmitting balls are provided in eight.

12. A driveshaft configured to transmit rotational driving force, comprising:

an interconnecting shaft; and a constant velocity joint coupled to the interconnecting shaft, wherein the constant velocity joint comprises:

an outer race forming a plurality of outer ball tracks;

an inner race forming a plurality of inner ball tracks corresponding to the plurality of the outer ball tracks;

a ball cage interposed between the outer race and the inner race and forming a plurality of windows; and a plurality of torque transmitting balls respectively disposed in spaces formed by pairs of the outer and inner ball tracks in a state of being respectively housed in the windows;

wherein the outer race and the inner race are configured to implement an angular articulation function that allows for relative angular displacement therebetween, wherein the inner race is coupled to the interconnecting shaft via a ball spline coupling structure to implement a length displacement function through relative axial displacement along an axial direction of the interconnecting shaft, and wherein the outer race and the inner race are configured to allow axial relative displacement due to a clearance between the outer race and the inner race.

\* \* \* \* \*